3,796,698
ANTIBIOTIC DERIVATIVES OF GENTAMICIN $C_2$
Takayuki Naito, Susumu Nakagawa, and Yoshio Abe, Tokyo, Japan, assignors to Bristol-Myers Company, New York, N.Y.
No Drawing. Filed Oct. 18, 1972, Ser. No. 298,748
Int. Cl. C07c 129/18
U.S. Cl. 260—210 AB
8 Claims

ABSTRACT OF THE DISCLOSURE

Derivatives of gentamicin $C_2$ have been prepared which possess substantially improved antibacterial activity. An example of such an agent is 1-[L-(—)-γ-amino-α-hydroxybutyryl]-gentamicin $C_2$ [III, BB-K75].

BACKGROUND OF THE INVENTION

(1) Field of the invention

This invention relates to a semisynthetic 1-substituted derivative of gentamicin $C_2$, said compound being prepared by acylating the 1-amino-function of gentamicin $C_2$ with a γ-amino-α-hydroxybutyryl moiety.

(2) Description of the prior art (A) Gentamicin (gentamycin) and the fermentation thereof is the subject matter of U.S. Pat. Nos. 3,091,572 which issued May 28, 1962 and 3,136,704 which issued June 9, 1964. The patents describe the fermentation of gentamicin complexes from *Micromonospora purpurea*, NNRL 2953 and *Micromonospora echinospora*, NNRL 2985. Variants thereof have also been deposited in the stock culture collection of the United States Department of Agriculture, Northern Utilization Research and Development Division, Peoria, Ill. as *M. echinospora* var. *ferruginea*, NNRL 2995 and *M. echinospora* var. *pallida*, NNRL 2996.

(B) Gentamicin is further described in the Merck Index, 8th edition, p. 485. The two major components, gentamicin $C_1$ and $C_2$ are described therein.

SUMMARY OF THE INVENTION

The compound having the formula

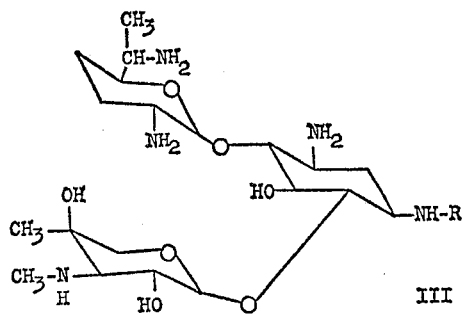

in which R is L-(—)-γ-amino-α-hydroxybutyryl; or a nontoxic pharmaceutically acceptable acid addition salt thereof is a valuable antibacterial agent.

This invention relates to semi-synthetic derivatives of gentamicin $C_2$, said compound being known as 1-[L-(—)-γ-amino-α-hydroxybutyryl]-gentamicin $C_2$ and having the formula

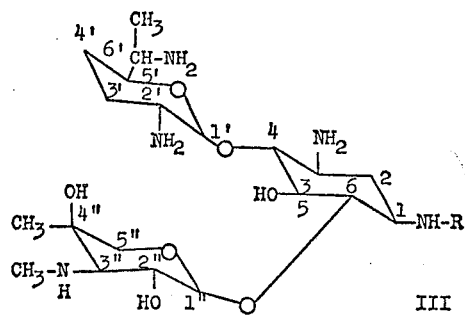

in which R is L-(—)-γ-amino-α-hydroxybutyryl; or a nontoxic pharmaceutically acceptable acid addition salt thereof.

For the purpose of this disclosure, the term "nontoxic pharmaceutically acceptable acid addition salt" shall mean a mono, di-, tri-, tetra, or penta salt formed by the interaction of 1 molecule of Compound III with 1–5 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

Gentamicin C is fermented as a complex of three closely related components designated "$C_1$," "$C_2$" and "$C_{1a}$." For the purpose of this application we are only concerned with gentamicin $C_2$, the starting material of the compounds of the instant invention, which has the formula

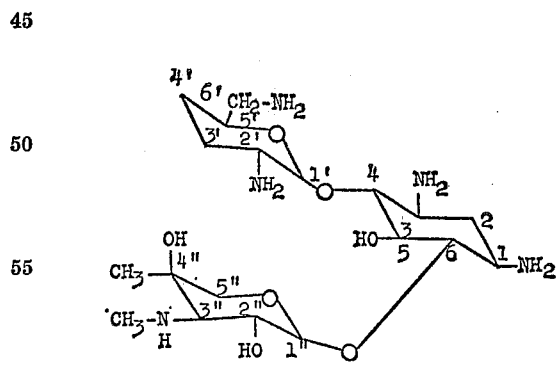

The compounds of the present invention are prepared by the following diagrammatic scheme:

(A) Gentamicin C₂ $\xrightarrow{\text{N-hydroxysuccinimide ester of L-(—)-}\gamma\text{-benzyloxycarbonylamino-}\alpha\text{-hydroxybutyric acid}}$

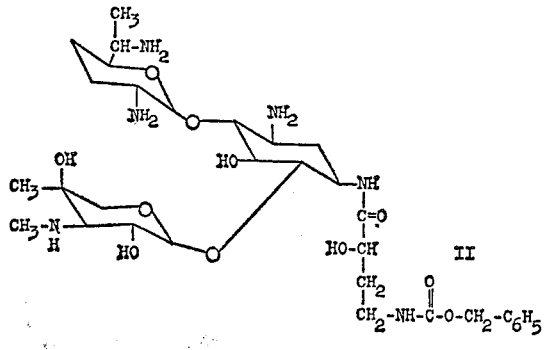

(B) Compound II $\xrightarrow{H_2/Pd/C}$

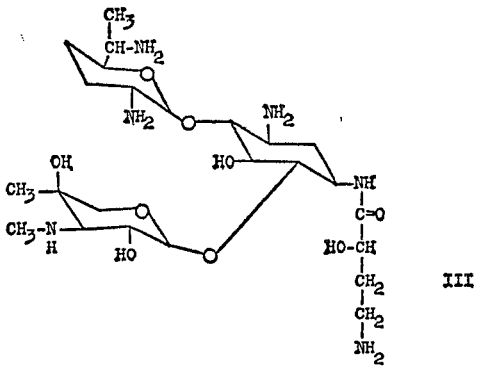

A preferred embodiment of the present invention is the compound having the formula

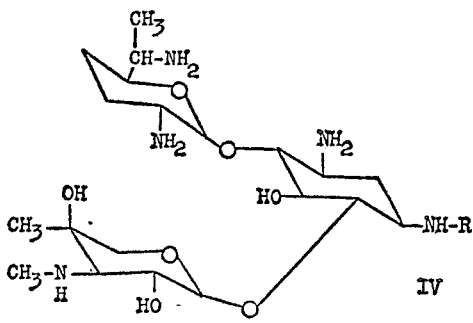

in which R is L-(—)-γ-amino-α-hydroxybutyryl or L-(—)-γ-benzyloxycarbonylamino-α-hydroxybutyryl; or a nontoxic pharmaceutically acceptable acid addition salt thereof.

A more preferred embodiment is the compound of Formula IV in which R is L-(—)-γ-benzyloxycarbonyl-amino-α-hydroxybutyryl; or an acid addition salt thereof.

A most preferred embodiment is the compound of Formula IV in which R is L-(—)-γ-amino-α-hydroxybutyryl; or a nontoxic pharmaceutically acceptable salt thereof.

The most preferred embodiment is the compound of Formula IV in which R is L-(—)-γ-amino-α-hydroxybutyryl; or the mono or disulfate salt thereof.

Other most preferred embodiments are the hydrochloride, acetate, maleate, citrate, ascorbate, nitrate or phosphate salts of Compound IV.

The objectives of the present invention have been achieved, by the provision according to the present invention of the process for the preparation of the compound having the formula

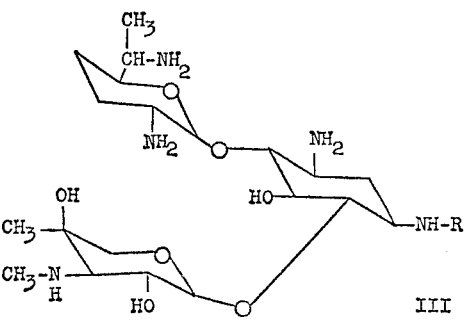

in which R is L-(—)-γ-amino-α-hydroxybutyryl; or a nontoxic pharmaceutically acceptable acid addition salt thereof; which process comprises the consecutive steps of (A) Acylating gentamicin C₂ with an acylating agent having the formula

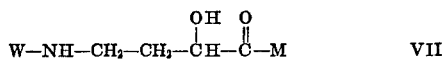

in which W is a radical selected from the group comprising

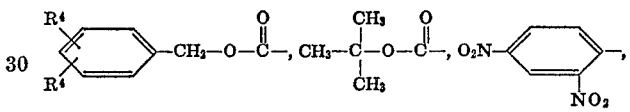

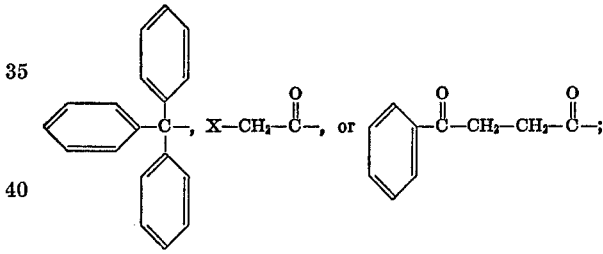

but preferably

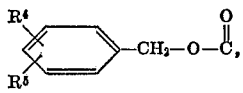

in which R⁴ and R⁵ are alike or different and each is H, F, Cl, Br, NO₂, OH, (lower)alkyl or ((lower)alkoxy, X is chloro, bromo or iodo and M is a radical selected from the group comprising

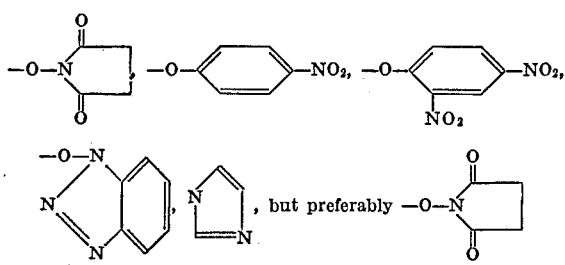

in a ratio of at least 0.5 mole of Compound VII per mole of Compound I but preferably in a ratio of about 0.5 to 1.4, and most preferably in a ratio of about 0.8 to about 1.1, in a solvent preferably selected from the group comprising a mixture of water and ethylene lycol dimethyl ether, dioxane, dimethylacetamide, dimethylformamide, tetrahydrofuran, propyleneglycol dimethyl ether, or the like but preferably 1:1 water-ethylene glycol dimethyl ether, to produce a compound of the formula

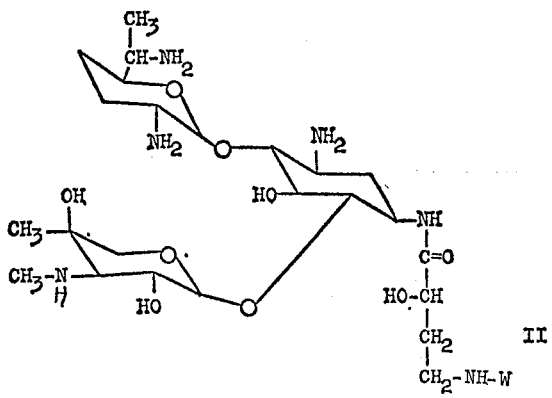

in which W is as above; and (B) Removing the blocking group W from the Compound II by methods commonly known in the art, and preferably when W is a radical of the formula

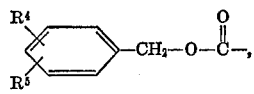

by hydrogenating Compound II with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water-dioxane, and preferably in the presence of a catalytic amount of glacial acetic acid to produce the compound of Formula III.

It should be apparent to those knowledgable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences 59, pp. 1-27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with the gentamicin $C_2$ derivative after first reacting said free acid with N,N'-dimethylchloroforminium chloride [cf. Great Britain 1,008,170 and Novak and Weichet, Experientia XXI/6, 360 (1965)] or of alkynylamine reagent [cf. R. Buijile and H. G. Viehe, Angew. Chem., International Edition 3, 582 (1964)], or of a ketenimine reagent [cf. C. L. Stevens and M. E. Munk, J. Amer. Chem. Soc. 80, 4065 (1958)] or of an isoxazolium salt regent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of a quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. These reactions are well-known in the art [cf. U.S. Pat. Nos. 3,079,314; 3,117,126 and 3,129,224 and British Pat. Nos. 932,644; 957,570 and 959,054].

Compound III, 1-[L-(−)-γ-amino-α-hydroxybutyryl]-gentamicin $C_2$, possesses excellent antibacterial activity. Illustrated below is a table showing the minimal inhibitory concentrations (MIC's) of gentamicin $C_2$, Compound III (BB-K75), and two other related mono- and diacylated derivatives of gentamicin $C_2$ against a variety of Gram-positive and Gram-negative bacteria as determined by the two-fold agar dilution method.

TABLE 1

In vitro antimicrobial activity of gentamicin $C_2$ derivatives

| Strain | Bristol No. | BB-K74 | BB-K75 | BB-K76 | Gentamicin $C_2$ |
|---|---|---|---|---|---|
| E. coli NIHJ | | 3.1 | 0.8 | 6.3 | 0.8 |
| E. coli Juhl | A15119 | 3.1 | 0.8 | 6.3 | 0.8 |
| E. coli Juhl | A15169 | 3.1 | 0.8 | 6.3 | 0.8 |
| E. coli Juhl KM-R¹ | A20363 | 3.1 | 0.4 | 6.3 | 0.8 |
| E. coli Juhl | A9844 | 3.1 | 0.4 | 6.3 | 0.8 |
| E. coli Juhl KM-R¹ | A20365 | 0.8 | 0.1 | 0.8 | 0.1 |
| E. coli K-12 | A9632 | 1.6 | 0.2 | 3.1 | 0.4 |
| E. coli K-12 KM-R¹ | A20664 | 0.8 | 0.2 | 3.1 | 0.4 |
| E. coli K-12 KM-R¹ | A20665 | 1.6 | 0.2 | 3.1 | 0.4 |
| E. coli W677 | A20684 | 0.8 | 0.2 | 6.3 | 0.8 |
| E. coli JR/W677 | A20683 | 12.5 | 0.4 | 3.1 | 12.5 |
| K. pneumoniae D-11 | | 0.8 | 0.1 | 0.8 | 0.2 |
| K. pneumoniae Type 22 | A20680 | 12.5 | 0.8 | 6.3 | 25 |
| Ser. marescens | A20019 | 3.1 | 1.6 | 6.3 | 0.8 |
| Ps. aeruginosa D-15 | | >100 | 25 | >100 | 6.3 |
| Ps. aeruginosa H9 D-113 KM-R¹ | | >100 | 100 | >100 | 12.5 |
| Ps. aeruginosa H9 | A9923 | >100 | 100 | >100 | 12.5 |
| Ps. aeruginosa H9 | A9930 | 3.1 | 0.8 | 6.3 | 0.4 |
| Ps. aeruginosa H9 | A15150 | >100 | >100 | >100 | 25 |
| Ps. aeruginosa H9 | A15194 | >100 | 50 | >100 | 12.5 |
| Ps. aeruginosa H9 GM-R³ | A20717 | >100 | >100 | >100 | >100 |
| Ps. aeruginosa H9 GM-R³ | A20718 | >100 | >100 | >100 | >100 |
| Ps. aeruginosa H6 D-114 NM-R⁴ | | >100 | 25 | >100 | 6.3 |

TABLE 1—Continued

| Strain | Bristol No. | BB-K74 | BB-K75 | BB-K76 | Gentamicin $C_2$ |
|---|---|---|---|---|---|
| Pr. vulgaris | A9436 | 1.6 | 0.8 | 3.1 | 0.4 |
| Pr. vulgaris | A9526 | 3.1 | 0.8 | 6.3 | 0.4 |
| Pr. mirabilis | A9554 | 12.5 | 1.6 | 25 | 0.8 |
| Pr. mirabilis | A9900 | 6.3 | 1.6 | 25 | 0.8 |
| Pr. morganii | A9553 | 3.1 | 1.6 | 25 | 0.8 |
| Pr. morganii | A20031 | 6.3 | 3.1 | 25 | 0.8 |
| S. aureus Smith | A15167 | 0.8 | 0.2 | 3.1 | 0.2 |
| S. aureus 209P SM-R [2] | | 12.5 | 3.1 | 25 | 0.8 |
| S. aureus KM-R [1] | A20239 | 3.1 | 0.8 | 6.3 | 0.4 |

[1] KM-R is kanamycin resistant.
[2] SM-R is streptomycin resistant.
[3] GM-R is gentamicin resistant.
[4] NM-R is neomycin resistant.

Since gentamicin $C_2$ has several amino functions capable of acylation when treated with the N-hydroxysuccinimide ester of L-(−)-γ-benzyloxycarbonylamino-α-hydroxybutyric acid, varying quantities of different products are obtained depending upon the site of acylation when treated according to the following scheme:

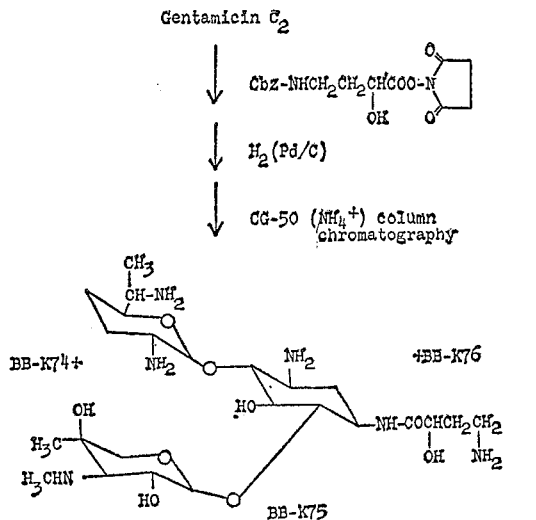

It can be seen that the process produced three different HABA-substituted gentamicin $C_2$ derivatives, herein designated BB-K74, BB-K75 and BB-K76. BB-K75 was determined to be 1-[L-(−)-γ-amino-α-hydroxybutyryl]-gentamicin $C_2$ (III).

BB-K75, the most active product, is equally active or more active than gentamicin $C_2$ against E. coli and K. pneumoniae strains tested so far. It is 16–32 times more active against E. coli A20683 and K. pneumoniae A20680 which are known to inactivate gentamicin C by 2″-adenylation, but 2–8 times less active against strains of Pseudomonas, Proteus and Staphylococcus.

BB-K74 is a monoacylated gentamicin $C_2$ derivative and BB-K76 a diacylated gentamicin $C_2$ derivative. The acylation sites of these two compounds have not been determined.

BB-K74 and BB-K76 were also similar in their antibacterial features to that of BB-K75, although less active. In comparison with the parent antibiotic gentamicin $C_2$, all of the acylation products isolated here showed improved activity against the two gentamicin-resistant strains (E. coli A20683 and K. penumoniae A20680), whereas the activity decreased to almost nothing against the gentamicin-resistant strains of Pseudomonas.

BB-K74, BB-K75 and BB-K76 were confirmed by TLC (thin layer chromatography) to liberate gentamicin $C_2$ and L-HABA on hydrolysis with 0.5 N aqueous NaOH solution at 100° C. for one hour. Thus these three compounds were proved to be gentamicin $C_2$ derivatives acylated with L-HABA. This fact, as well as the presence of an amido-carbonyl band in the IR (infrared) spectra, show that all of them are gentamicin $C_2$ derivatives.

Compound III is valuable as an antibacterial agent, nutritional supplement in animal feeds, therapeutic agent in poultry and animals, including man, and is especially valuable in the treatment of infectious diseases caused by Gram-positive and Gram-negative bacterial.

Compound III is useful as an adjunctive treatment for preoperative sterilization of the bowel when administered orally. Both aerobic and anaerobic flora which are susceptible to this drug are reduced in the large intestine. When accompanied by adequate mechanical cleansing, it is useful in preparing for colonic surgery.

Compound III is effective in the treatment of systemic bacterial infections when administered parenterally in the dosage range of about 250 mg. to about 3000 mg. per day-in divided doses three or four times a day. Generally the compound is effective when administered at a dosage of about 5.0 to 7.5 mg./kg. of body weight every 12 hours.

Genamicin C is a complex of at least three major components differing only the $R^3$ substituent found on the 5' position of the dideoxy-sugar moiety of the gentamicin nucleus as shown below:

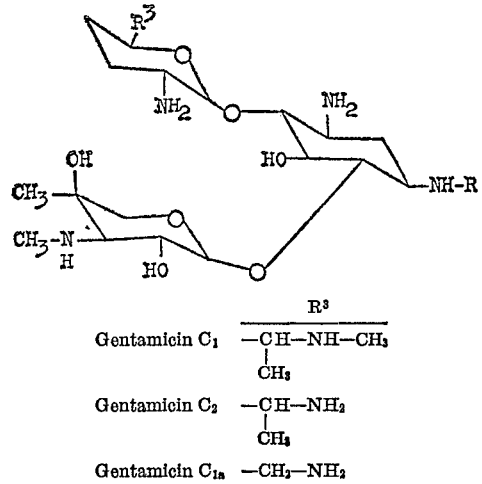

|  | $R^3$ |
|---|---|
| Gentamicin $C_1$ | —CH—NH—CH$_3$<br>\|<br>CH$_3$ |
| Gentamicin $C_2$ | —CH—NH$_2$<br>\|<br>CH$_3$ |
| Gentamicin $C_{1a}$ | —CH$_2$—NH$_2$ |

Gentamicin $C_2$ was obtained from the complex by the following procedure.

SEPARATION OF GENTAMICIN C COMPLEX

Gentamicin C complex (4.10 g.) as the free base was fractionated using a preparative counter current distribution (CCD) apparatus (100 ml.×50 tubes) with a solvent system of CHCl$_3$—MeOH—17% aqueous NH$_4$OH (2:1:1) to give the fractions shown below.

| Fraction | Tube Nos. | Amount recovered, g. | Identification (TLC [1]) |
|---|---|---|---|
| I | 25–33 | 1.46 | $C_1$ main. |
| II | 32–42 | 0.72 | $C_1$ $C_2$. |
| III | 43–47 | 1.20 | $C_2+C_{1a}$. |
| IV | 48–50 | 0.87 | $C_{1a}$ main. |

[1] Cellulose thin-layer plate, solvent system: lower layer of CHCl$_3$–MeOH–17% NH$_4$OH (2:1:1); $R_f$: gentamicin $C_1$ (0.69), $C_2$ (0.39), $C_{1a}$ (0.23).

Fractions I and II were combined and distributed again by the same CCD system as above to give 1.94 g. of the gentamicin $C_1$ component which was further purified by a Dowex 1 X2 column chromatography yielding 1.70 g. of substantially pure gentamicin $C_1$. Other fractions were purified similarly by CCD and Dowex 1 X2 chromatography to give 1.13 g. of gentamicin $C_2$ and 0.62 g. of gentamicin $C_{1a}$.

Dowex 1 X2 is a resin comprised of a polystyrene backbone to which is attached benzyltrimethylammonium chloride and 2% of added divinylbenzene as a crosslinking agent during polymerization of the polystyrene. It is supplied as beads.

EXAMPLES

Example 1.—Preparation of L-(−)-γ-benzyloxycarbonylamino-α-hydroxybutyric acid (VI)

L - (−) - γ - amino - α - hydroxybutyric acid (7.4 g., 0.062 mole) was added to a solution of 5.2 g. (0.13 mole) of sodium hydroxide in 50 ml. of water. To the stirred solution was added dropwise at 0–5° C. over a period of 0.5 hour, 11.7 g. (0.068 mole) of carbobenzoxy chloride and the mixture aws continued to stir for one hour at the same temperature. The reaction mixture was washed with 50 ml. of ether, adjusted to pH 2 with dilute hydrochloric acid and extracted with four 80-ml. portions of ether. The ethereal extracts were combined, washed with a small amount of saturated sodium chloride solution, dried with anhydrous sodium sulfate and filtered. The filtrate was evaporated in vacuo and the resulting residue was crystallized from benzene to give 11.6 g. (74%) of colorless plates; melting point 78.5–79.5° C., $[\alpha]_D = 4.5$ (c.=2, $CH_2OH$). Infrared (IR) [KBr]: IR (KBr)γC=O 1740, 1690 cm.$^{-1}$. Nuclear Magnetic Resonance (NMR) (acetone-$d_6$)δ (in p.p.m. from TMS) 2.0 (2H, m.), 3.29 (2H, d-d, J=6.7 and 12 Hz.), 4.16 (1H, d-d, J=4.5 and 8 Hz.), 4.99 (2H, s.), 6.2 (2H, broad), 7.21 (5H, s.).

Analysis.—Calc'd for $C_{12}H_{15}NO_5$ (percent): C, 56.91; H, 5.97; N, 5.53. Found (percent): C, 56.66; H, 5.97; N, 5.47.

Example 2.—N-hydroxysuccinimide ester of L-(−)-γ-benzyloxycarbonylamino-α-hydroxybutyric acid (VII)

A solution of 10.6 g. (0.042 mole) of VI and 4.8 g. (0.042 mole) of N-hydroxysuccinimide [1] in 200 ml. of ethyl acetate was cooled to 0° C. and then 8.6 g. (0.042 mole) of dicyclohexylcarbodiimide was added. The mixture was kept overnight in a refrigerator. The dicyclohexylurea which separated was filtered off and the filtrate was concentrated to about 50 ml. under reduced pressure to give colorless crystals of VII which were collected by filtration; 6.4 g., M.P. 121–122.5° C. The filtrate was evaporated to dryness in vacuo and the crystalline residue was washed with 20 ml. of a benzene-n-hexane-mixture to give an additional amount of VII. The total yield was 13.4 g. (92%). $[\alpha]_D + 1.5°$ (c.=2, $CHCl_3$) IR (KBr) γC=O 1810, 1755, 1740, 1680 cm.$^{-1}$. NMR (acetone-$d_6$)δ (in p.p.m. from TMS) 2.0, (2H, m.), 2.83 (2H, s.), 3.37 (2H, d-d, J=6.5 and 12.5 Hz.), 4.56 (1H, m.), 4.99 (2H, s.), 6.3 (2H, broad), 7.23 (5H, s.).

Analysis.—Calc'd for $C_{16}H_{18}N_2O_7$ (percent): C, 54.85; H, 5.18; N, 8.00. Found (percent): C, 54.79, 54.70; H, 5.21, 5.20; N, 8.14, 8.12.

Example 3.—Preparation of 1-[L-(−)-γ-amino-α-hydroxybutyryl]-gentamicin $C_2$ (III)

To a stirred solution of 325 mg. (0.7 mmole) of gentamicin $C_2$ in 40 ml. of 75% aqueous THF (tetrahydrofuran) was added 245 mg. (0.7 mmole) of N-hydroxysuccinimide ester of L-(−)-γ-benzyloxycarbonylamino-α-hydroxybutyric acid. The mixture was stirred overnight at room temperature and hydrogenated with 10% palladium on charcoal for seven hours at ordinary temperature and pressure. The reaction mixture was filtered, the filtrate was evaporated in vacuo to remove the organic solvent and the resulting concentrate charged on a column of Amberlite CG-50 ion-exchanger ($NH_4^+$ form, 10 ml.), which was washed with 60 ml. of water and eluted successively with 0.1 N $NH_4OH$ (480 ml.), 0.2 N $NH_4OH$ (450 ml.) add 0.5 N $NH_4OH$ (800 ml.). The eluate was collected in 10-ml. fractions. The fractions were monitored by ninhydrin spot test, disc assay and TLC, and grouped as follows. Each group was concentrated under reduced pressure and lyophilized.

| Group | Fraction number | Eluted with— | Weight isolated, mg. | Compound |
|---|---|---|---|---|
| 1 | 37–65 | 0.1–0.2 N $NH_4OH$ | 28 | Crude BB–K73. |
| 2 | 101–130 | 0.5 N $NH_4OH$ | | A mixture of BB–K74 and BB–K75. |
| 3 | 161–170 | 0.5 N $NH_4OH$ | 18 | BB–K76. |

Rechromatography of group 1 with Amberlite CG–50 ($NH_4^+$ form) gave 12 mg. of pure BB–K73 (determined to be an L-HABA acylated impurity of a material other than gentamicin $C_2$).

Rechromatography of group 2 with CG–50 gave 21 mg. of BB–K74 and 21 mg. of BB–K75.

Properties

| Code No. | M.P., °C. (dec.) | Rf [1] | γC=O (KBr), cm.$^{-1}$ |
|---|---|---|---|
| BB–K73 | 130–135 | 0.58 | 1,640 |
| BB–K74 | 150–155 | 0.33 | 1,640 |
| BB–K75 | 160–165 | 0.15 | 1,640= |
| BB–K76 | >230 | 0.08 | 1,640 |

[1] TLC: silica gel plate, $CHCl_3$-MeOH-28% $NH_4OH$-$H_2O$ (2:8:2:1).

Amberlite CG 50 is the trade name for the chromatographic grade of a weakly acidic cationic exchange resin of a carboxylic-polymethacrylic type.

Example 4.—Preparation of L-(−)-γ-amino-α-hydroxybutyric acid from ambutyrosin A or B or mixtures thereof Ambutyrosin A (5.0 gm.) [U.S. Pat. No. 3,541,078, issued Nov. 17, 1970] was refluxed with 160 ml. of 0.5 N sodium hydroxide for one hour. The hydrolysate was neutralized with 6 N HCl and chromatographed on a column of CG–50 ($NH_4^+$ type). The desired L-(−)-γ-amino-α-hydroxybutyric acid was isolated by developing the column with water and removing the water by freeze drying. The L-(−)-γ-amino-α-hydroxybutyric acid is characterized as a crystalline material having M.P. of 212.5–214.5° C. [column 2, lines 31–38, U.S. Pat. No. 3,541,078].

Example 5.—Preparation of L-(−)-γ-amino-α-hydroxybutyric acid from DL-α-hydroxy-γ-phthalimodbutyric acid (A) Dehydroabietylammonium L-α-hydroxy-γ-phthalimidobutyrate: To a solution of 25 g. (0.1 mole) of 2-hydroxy-γ-phthalimidobutyric acid [2] in 200 ml. of ethanol was added a solution of 29 g. (0.1 mole) of dehydroabietylamine in 130 ml. of ethanol. The solution was shaken vigorously for a minute and stood at room temperature for five hours during which time fine needles crystallized out. The crystals were collected by filtration, washed with 50 ml. of ethanol and air dried to obtain 30.1 g. (56%) of a diastereomer of the dehydroabietylamine salt. M.P. 93–94° C. $[\alpha]_D^{24} + 15°$ (C. 2.5, MeOH). Recrystallization from 300 ml. of ethanol gave 23.2 g. (43%) of the pure product. M.P. 94–95° C. $[\alpha]_D^{24} + 10.8°$ (C. 2.5, MeOH). Further recrystallization did not change the melting point and the specific rotation.

---

[1] G. W. Anderson et al., J. Am. Chem. Soc., 86, 1839 (1964).

[2] Y. Saito et al., Tetrahedron Letters, 1970, 4863.

*Analysis.*—Calc'd for $C_{32}H_{42}N_2O_5 \cdot H_2O$ (percent): C, 69.54; H, 8.02; N, 5.07. Found (percent): C, 69.58; H, 8.08; N, 5.07.

(B) L-(—)-γ-amino-α-hydroxybutyric acid: To a solution of 1.5 g. (0.014 mole) of sodium carbonate in 40 ml. of water were added 5.3 g. (0.01 mole) of dehydroabietyl-ammonium-L-α-hydroxy-γ-phthalimidobutyrate and 60 ml. of ether. The mixture was shaken vigorously until all of the solid had dissolved. The ether layer was separated. The aqueous solution was washed twice with 20-ml. portions of ether and evaporated to 15 ml. under reduced pressure. To the concentrate was added 10 ml. of concentrated hydrochloric acid and the mixture was refluxed for ten hours. After cooling, separated phthalic acid was removed by filtration. The filtrate was evaporated under reduced pressure. The residue was dissolved in 10 ml. of water and the solution was evaporated to dryness. This operation was repeated twice to remove excess hydrochloric acid. The residual syrup was dissolved in 10 ml. of water and filtered to remove a small amount of insoluble phthalic acid. The filtrate was adsorbed on a column of IR–20 (H+, 1 cm. x 35 cm.), the column was washed with 300 ml. of water and eluted with 1 N ammonium hydroxide solution. The eluate was collected in 15-ml. fraction. The ninhydrin positive fractions 10 to 16 were combined and evaporated under reduced pressure to give a syrup which crystallized gradually. The crystals were triturated with ethanol, filtered and dried in a vacuum desiccator to give 0.78 g. (66%) of L-(—)-γ-amino-α-hydroxybutyric acid, M.P. 206–207° C. $[\alpha]_D^{24}$ —29° (C. 2.5, $H_2O$). The IR spectrum was identical with the authentic sample which was obtained from ambutyrosin.

Amberlite IR–120 is the trade name for a high density nuclear sulfonic acid type cationic exchange resin supplied in either hydrogen or sodium form as beads—16–50 mesh.

Example 6.—Preparation of the monosulfate salt of 1-[L-(—)-γ-amino-α-hydroxybutyryl]gentamicin $C_2$ One mole of 1-[L-(—)-γ-amino-α-hydroxybutyryl]-gentamicin $C_2$ is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture till precipitation occurs. The solids are collected by filtration and are determined to be the desired monosulfate.

Example 7.—Preparation of the disulfate salt of 1-[L-(—)-γ-amino-α-hydroxybutyryl]gentamicin $C_2$ One mole of 1-[L-(—)-γ-amino-α-hydroxybutyryl]-gentamicin $C_2$ is dissolved in 1 to 3 liters of water. The solution is filtered to remove any undissolved solids. To the chilled and stirred solution is added two moles of sulfuric acid dissolved in 100 ml. of water. The mixture is allowed to stir for 30 minutes, following which cold ethanol is added to the mixture until precipitation occurs. The solids are collected by filtration and are determined to be the desired disulfate salt.

We claim:
1. A compound having the formula

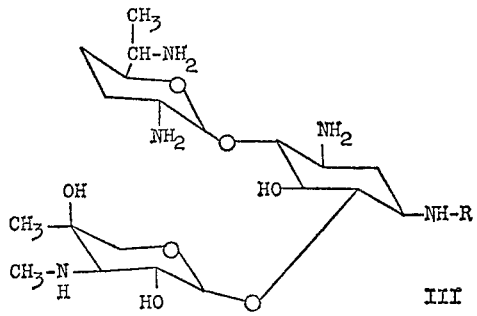

III in which R is L-(—)-γ-amino-α-hydroxybutyryl or L-(—)-γ-benzyloxycarbonylamino-α-hydroxybutyryl; or a nontoxic pharmaceutically acceptable acid addition salt thereof.

2. The compound of claim 1 wherein R is L-(—)-γ-benzyloxycarbonylamino-α-hydroxybutyryl; or an acid addition salt thereof.

3. The compound of claim 1 wherein R is L-(—)-γ-amino-α-hydroxybutyryl; or a nontoxic pharmaceutically acceptable acid addition salt thereof.

4. The monosulfate salt of the compound of claim 3.
5. The disulfate salt of the compound of claim 3.
6. The mono or polyhydrates of the compound of claim 3.
7. The mono or polyhydrates of the compounds of claim 4.
8. The mono or polyhydrates of the compounds of claim 5.

References Cited
UNITED STATES PATENTS

| 3,268,508 | 8/1966 | Sugazawa et al. | 260—210 K |
| 3,647,779 | 3/1972 | Schmitz | 260—210 AB |
| 3,651,042 | 3/1972 | Marquez et al. | 260—210 AB |

JOHNNIE R. BROWN, Primary Examiner

U.S. Cl. X.R.

99—2 AB; 424—181